United States Patent [19]

Tajiri et al.

[11] Patent Number: 4,980,448

[45] Date of Patent: Dec. 25, 1990

[54] CROSSLINKED POLYESTER FOR TONER AND PROCESS FOR PREPARATION THEREOF

[75] Inventors: Noriyuki Tajiri; Masayuki Takyu; Hirokazu Ito, all of Toyohashi; Ryo Funato; Shinji Kubo, both of Nagoya, all of Japan

[73] Assignee: Mitsubishi Rayon Company, Ltd., Tokyo, Japan

[21] Appl. No.: 323,793

[22] Filed: Mar. 15, 1989

[30] Foreign Application Priority Data

Mar. 17, 1988 [JP] Japan ................................. 63-64930
Apr. 21, 1988 [JP] Japan ................................. 63-96744
Jul. 23, 1988 [JP] Japan ................................. 63-182808

[51] Int. Cl.$^5$ ............................................. G03G 63/18
[52] U.S. Cl. ..................................... 528/194; 430/109
[58] Field of Search ................... 430/108, 109, 110; 528/194

[56] References Cited

U.S. PATENT DOCUMENTS 4,804,622  2/1989  Tanaka et al. ...................... 430/109
4,849,495  7/1989  Funato et al. ...................... 528/194

Primary Examiner—John L. Goodrow
Attorney, Agent, or Firm—Oblon, Spivak, McClelland, Maier & Neustadt

[57] ABSTRACT

Disclosed is a crosslinked polyester for a toner, which has an acid value of 5 to 20 mgKOH/g, a flow index of $0.1 \times 10^{-4}$ to $300 \times 10^{-4}$ ml/sec and a softening point lower than 145° C., the polyester being formed by mixing a dicarboxylic acid component, a diol component and at least one crosslinking component selected from a polyfunctional carboxylic acid component having a trivalency or a higher valency and a polyhydric alcohol component having a trivalency or a higher valency at a mixing ratio represented by the following formula (1), reacting the mixture at a reaction ratio represented by the following formula (2) and subjecting the esterification product to polycondensation and crosslinking.

$$0.8 \leq R \leq 1 + 5a \qquad (1)$$

$$0.7 \leq P \leq [R/(1+a)]^{\frac{1}{2}} \qquad (2)$$

wherein R is the ratio of the mole number of the total alcohol components to the mole number of the total acid components, a is the ratio of the sum of the mole number of the polyvalent carboxylic acid component and the mole number of the polyhydric alcohol component to the mole number of the total acid components, and P is the conversion of the carboxylic acid components.

The toner comprising this crosslinked polyester as the binder has an excellent offset-preventing property, low-temperature fixing property and blocking resistance and good charging characteristics with a high moisture resistance, and gives a copied image having good sharpness and image density.

22 Claims, No Drawings

CROSSLINKED POLYESTER FOR TONER AND PROCESS FOR PREPARATION THEREOF

BACKGROUND OF THE INVENTION (1) Field of the Invention

The present invention relates to a polyester for a toner to be used for the development of an electronic latent image such as a statically charged image in the electrostatic printing process.

(2) Description of the Related Art

An image-forming process, such as an electrophotographic copying process or an electrostatic printing process, which comprises forming an electronic latent image such as a statically charged image or an electroconductive image corresponding to an image to be recorded on the surface of an electrostatic recording material, developing and visualizing the electronic latent image with a charged toner, transferring the formed toner image on the surface of the electrostatic recording material to a paper or a recording film, and fixing the transferred image, is advantageous in that prints can be obtained at a high speed, the fixing stability of the image on the surface of the recording material is good, and the image-forming apparatus used in this process is easily operated. Accordingly, this image-forming process is widely used in the field of copying machines.

For example, when an image is formed by a photographic copying machine, the surface of a roller composed of a photoconductive and photosensitive material is charged, an electrostatic latent image is formed by the exposure to light reflected from the surface of an original to be copied, the latent image is developed with a toner, the formed visible image is transferred to a paper or the like, and the transferred image is fixed on the paper by compression under heating, and thus a copy print is obtained.

Toners comprising a crosslinked polyester as the binder have been developed for the above-mentioned image-forming process, and toners of this type are disclosed, for example, in U.S. Patent No. 3,938,972, British Patent No. 2,082,788A, Japanese Examined Patent Publication No. 61-59333, and Japanese Unexamined Patent Publication No. 62-127752.

To increase the operational efficiency of copying machines or printers, the image-forming treatment should be carried out at a higher speed, and accordingly, various attempts have been made to increase the treatment speed.

A serious problems when carrying out an image-forming treatment at a high speed in the above-mentioned image-forming process is how to increase the speed of fixing a toner image, formed by visualizing an electrostatic latent image, to the surface of a recording material. To solve this problem, the toner must have an excellent low-temperature fixing property and an excellent electric characteristic such that the electrostatic latent image formed on the surface of the photoconductive and photosensitive material is clearly visualized, but none of the conventional toners comprising a polyester as the binder satisfies these requirements.

The low-temperature fixing property of the toner can be improved by using a polyester binder having a low softening point, but a toner comprising a polyester having a low softening point as the binder is unsatisfactory in that, since the transferability of the toner at the fixing treatment is poor, the toner remains on the surface of a transferring hot roller or the like, and an offset phenomenon, i.e., contamination of a following transfer paper of the like, occurs.

As a toner having an improved offset-preventing property, Japanese Examined Patent Publication No. 61-59333 proposed a toner comprising, as the binder, a crosslinked polyester formed by reacting etherified bisphenol A with a dicarboxylic acid to obtain a linear polyester, and reacting this linear polyester with a polyfunctional carboxylic acid having a trivalency or higher valency, such as trimellitic anhydride.

This toner has an excellent offset-preventing property, but since the softening point of the crosslinked polyester constituting the binder of this toner is high, the high-speed fixing property is not satisfactory.

For example, if the copying operation is carried out at a fixing speed of about 50 sheets per minute when using this toner in the electrostatic photographic copying process, the fixing property of the toner is poor and a copy having a satisfactory toner fixing strength cannot be obtained.

A polyester having a reduced softening point, which can be used as a toner having a good offset-preventing property and a good low-temperature fixing property, is disclosed in Japanese Unexamined Patent Publication No. 62-127752. This polyester is a crosslinked polyester in which long-chain aliphatic hydro-carbon units are introduced, but since the glass transition point (Tg) of the crosslinked polyester is too low, in a toner comprising this polyester as the binder, an agglomeration of toner particles occurs during storage, resulting in blocking. Namely, the toner has a poor storage stability.

The image density and contrast of a toner image formed by visualizing a charged latent image formed on the photoconductive and photosensitive material with a toner are greatly influenced by the toner charge quantity. Accordingly, the toner charge quantity is generally adjusted to an appropriate level by the addition of a charge-control agent. This charge-control agent is expensive, and therefore, the development of a binder resin having an excellent self-charge-ability and able to provide an excellent charge-control effect although using a reduced amount of the charge-control agent, is strongly desired, but such a polyester resin has not been developed as yet.

Furthermore, the moisture resistance of the toner is important when ensuring the stability of the image formed by visualizing the electrostatic latent image on the photoconductive and photosensitive material, but a polyester resin capable of imparting a required moisture resistance to the toner has not been developed.

SUMMARY OF THE INVENTION

Under the above background, the inventors carried out research into the development of a toner having an excellent offset-preventing property, low-temperature fixing property, and self-chargeability and able to be manufactured at a low cost, and as a result, completed the present invention.

More specifically, in accordance with the present invention, there can be provided a crosslinked polyester for a toner, which has an acid value of 5 to 20 mgKOH/g, a flow index of $0.1 \times 10^{-4}$ to $300 \times 10^{-4}$ ml/sec, and a softening point lower than 145° C., the polyester being formed by mixing a dicarboxylic acid component, a diol component, and at least one crosslinking component selected from the group consisting of a polyfunctional carboxylic acid component having a trivalency or higher valency and a polyhydric alcohol component having a trivalency or a higher valency at a mixing ratio represented by the following formula (1), reacting the mixture at a reaction ratio represented by the following formula (2), and subjecting the esterification product to polycondensation and crosslinking:

$$0.8 \leq R \leq 1 + 5a \quad (1)$$
$$0.7 \leq P \leq [R/(1+a)]^{1/78} \quad (2)$$

wherein R stands for the ratio of the mole number of the total alcohol components to the mole number of the total acid components, a stands for the ratio of the sum of the mole number of the polyvalent carboxylic acid component having a trivalency or higher valency and the mole number of the polyhydric alcohol component having a trivalency or a higher valency to the mole number of the total acid components, and P stands for the conversion of the carboxylic acid components.

DESCRIPTION OF THE PREFERRED EMBODIMENTS

The crosslinked polyester for a toner according to the present invention has an acid value of 5 to 20 mgKOH/g, a flow index of $0.1 \times 10^{-4}$ to $300 \times 10^{-4}$ ml/sec, and a softening point lower than 145° C. Furthermore, the crosslinked polyester for a toner according to the present invention has a hydroxyl group value of 5 to 50 mgKOH/g.

The polyester resin for a toner according to the present invention is a crosslinked polyester resin having a network structure, and therefore, a toner comprising this polyester resin as the binder has an excellent offset-preventing property.

Furthermore, the polyester resin of the present invention has a softening point lower than 145° C., and a good flowability when molten, and a toner comprising this polyester as the binder has an excellent low-temperature fixing property, thus allowing the development to be performed at a high speed.

Since the toner comprising the polyester of the present invention as the binder has the above-mentioned excellent characteristics, even if the toner-fixing temperature is considerably higher than the softening point of the polyester, the fixing property to a paper, a film or the like is excellent, and the offset to a fixing roller or the like is effectively prevented.

Moreover, since the polyester of the present invention has a specific acid value, it exhibits a good and negative self-chargeability. Accordingly, if the polyester of the present invention is used, a toner having a good self-chargeability can be obtained even if a charge-control agent is not used. If a charge-control agent is incorporated, however, the chargeability characteristics are further improved.

The crosslinked polyester resin of the present invention can be prepared by mixing a dicarboxylic acid, a diol, and at least one crosslinking component selected from the group consisting of a polyvalent carboxylic acid having a trivalency or a higher valency and a polyhydric alcohol having a trivalency or a higher valency, at a mixing ratio represented by the following formula (1), reacting the mixture at a reaction ratio represented by the following formula (2) to obtain an ester, and reacting the obtained ester under a pressure lower than 150 mmHg in the presence of a polycondensation catalyst to effect polymerization while removing the formed diol component from the reaction system:

$$0.8 \leq R \leq 1 + 5a \quad (1)$$
$$0.7 \leq P \leq [R/(1+a)]^{1/2} \quad (2)$$

wherein R stands for the ratio of the mole number of the total alcohol components to the mole number of the total acid components, a stands for the ratio of the sum of the mole number of the polyvalent carboxylic acid component having a trivalency or higher valency and the mole number of the polyhydric alcohol component having a trivalency or a higher valency to the mole number of the total acid components, and P stands for the conversion of the carboxylic acid components.

Note, the mole number of the total carboxylic acid components means the amount (moles) of the total carboxylic acids used for formation of the esterification product, and if a monocarboxylic acid or the like is used in addition to the above-mentioned carboxylic acid components, this monocarboxylic acid or the like is included.

If a mixture of the starting materials in which R is smaller than 0.8 is used for obtaining an esterification product, it is impossible to obtain an esterification product that can be converted to a polyester at the subsequent polycondensation step, and if a mixture of the starting materials in which R is larger than 1 + 5a is used, the acid value of the polyester obtained by the polycondensation of the esterification product under the condition represented by the formula (2) is smaller than 5 mgKOH/g, and the self-chargeability is poor.

Even if as esterification product obtained by esterifying the above-mentioned mixture of the starting materials under conditions where P is smaller than 0.7, is subjected to a subsequent polycondensation, a polyester having the characteristics required for the present invention can not be easily obtained. In an esterification, if P is larger than $[R/(1+a)]^{1/2}$, gelation occurs at the esterification step, and a reaction cannot be controlled.

An embodiment of the process for the preparation of the polyester resin of the present invention will now be described.

The above-mentioned polycarboxylic acid and polyol components are charged in an autoclave at a ratio satisfying the requirement of formula (1), and esterification is carried out within a conversion represented by formula (2).

If the esterification is advanced beyond the upper limit of the conversion P represented by formula (2), i.e., $[R/1+a)]^{1/2}$, rapid and uncontrollable gelation occurs during the reaction.

In contrast, if the reaction is conducted under conditions where the conversion P does not reach the lower limit represented by formula (2), i.e., 0.7, gelation hardly occurs at the subsequent step of a polycondensation and crosslinking of the esterification product, and the intended crosslinked polyester of the present invention cannot be obtained.

The reaction for forming the esterification product from the mixture of the starting materials can be carried out under a pressure of 300 mmHg to 7 kg/cm², but preferably the reaction is carried out under atmospheric pressure or an elevated pressure of up to 5 kg/cm² while removing water or a monoalcohol formed by the reaction from the reaction system by distillation.

As specific examples of the dicarboxylic acid used for the preparation of the polyester of the present invention, there can be mentioned alkylene-dicarboxylic acids such as 1,2-propane-dicarboxylic acid, 1,3-butanedicarboxylic acid, 2,3-butane-dicarboxylic acid, 3-methyl-glutaric acid, 2,2-dimethyl-1,3-propanedicarboxylic acid, 1,2-dimethyl-1,3-propane-dicarboxylic acid, 1,3-dimethyl-1,3-propane-dicarboxylic acid, 1,2,3-trimethyl-1,3-propane-dicarboxylic acid, 2,3-dimethyl-1,4-butane-dicarboxylic acid, 3,3-diethyl-1,5-pentane-dicarboxylic acid, malonic acid, maletic acid, glutaric acid, adipic acid and sebacic acid, alicyclic dicarboxylic acids such as cyclohexanedicarboxylic acid, aromatic dicarboxylic acids such as terephthalic acid, isophthalic acid, orthophthalic acid, 3,5-toluene-dicarboxylic acid, 2,4-toluene-dicarboxylic acid, 2,5-toluene-dicarboxylic acid and naphthalenedicarboxylic acid, anhydrides of the foregoing dicarboxylic acids, and alkyl esters of the foregoing dicarboxylic acids. These compounds can be used singly or as a mixture of two or more thereof.

Where an alkyl ester of a dicarboxylic acid is used, preferably the alkyl ester of a dicarboxylic acid has up to 6 carbon atoms in the alkyl group, as this will increase the speed of the ester exchange with the other starting material, and from this viewpoint, an alkyl ester of a dicarboxylic acid having up to 3 carbon atoms in the alkyl group is especially preferred.

Among the foregoing starting dicarboxylic acid components, isophthalic acid, dimethyl isophthalate, terephthalic acid, and dimethyl terephthalate are especially effective for lowering the softening point of the obtained crosslinked polyester resin.

Where the aromatic dicarboxylic acid and a derivative thereof are used, in view of the Tg of the obtained polyester, preferably the amount of terephthalic acid and a dimethyl ester thereof is at least 40 mole%, and the amount of isophthalic acid and a dimethyl ester thereof is up to 60 mole%. Where the amount of terephthalic acid structural units in a polyester is too small, and the amount of isophthalic acid structural units is too large, the Tg is usually lowered, and the storage stability of a toner comprising this polyester as the binder, are unsatisfactory.

As specific examples of the diol used for the preparation of the crosslinked polyester resin of the present invention, there can be mentioned alkylene glycols such as ethylene glycol, 1,2-propylene glycol, trimethylene glycol, tetramethylene glycol, hexamethylene glycol and neopentyl glycol, alkylene ether glycols such as diethylene glycol, triethylene glycol, polyethylene glycol, polytetramethylene ether glycol and polypropylene tetramethylene ether glycol, alicyclic diols such as cyclohexane dimethanol and hydrogenated bisphenol A, and aromatic diols such as polyoxypropylene(2.3)-2,2-bis(4-hydroxyphenyl)propane, polyoxyethylene(2.0)-2,2-bis(4-hydroxyphenyl)propane and polyoxypropylene-p-hydroxybenzene. These diols can be used singly or as a mixture of two or more thereof.

Among the foregoing diols, ethylene glycol has a property such that the speed of the reaction with the dicarboxylic acid is increased, and an aromatic diol has a property such that is the obtained polyester is used as a binder, the chargeability is improved. Furthermore, a toner comprising a polyester prepared by using neopentyl glycol as the binder has an improved adhesiveness to a paper and a film. Accordingly, preferably these diols are used singly or in combination according to the characteristics required for the toner.

Preferably, ethylene glycol, an aromatic diol, and neopentyl glycol are used in amounts of at least 20 mole%, up to 80 mole%, and up to 80 mole%, respectively, based on the total carboxylic acid components.

As specific examples of the carboxylic acid having a trivalency or a higher valency, to be used for the preparation of the crosslinked polyester of the present invention, there can be mentioned 1,2,4-benzene-tricarboxylic acid, 1,2,5-benzene-tricarboxylic acid, 1,2,4-cyclohexane-tricarboxylic acid, 2,5,7-naphthalene-tricarboxylic acid, 1,2,4-naphthalene-tricarboxylic acid, 1,2,4-butane-tricarboxylic acid, 1,2,5-hexanetricarboxylic acid, 1,3-dicarboxyl-2-methyl-2-methylenecarboxyl-propane, tetra(methylene-carboxyl)methane, 1,2,7,8-octane-tetracarboxylic acid, and acid anhydrides and alkyl esters thereof. These compounds can be used singly or as a mixture of two or more thereof.

Where an alkyl ester of a polyvalent carboxylic acid is used as the polyvalent carboxylic acid, preferably an alkyl ester of a dicarboxylic acid having up to 6 carbon atoms in the alkyl group is used. Use of trimellitic anhydride or a methyl ester thereof as the carboxylic acid having a trivalency or a higher valency will improve the Tg of the polyester. Preferably, trimellitic anhydride or a methyl ester thereof is used in an amount of 5 to 40 mole% based on the total carboxylic acid components.

As the alcohol having a trivalency or a higher valency, to be used for the preparation of the crosslinked polyester of the present invention, these can be mentioned, for example, sorbitol, 1,2,3,6-hexane-tetrol, 1,4-sorbitane, pentaerythritol, dipentaerythritol, tripentaerythritol, 1,2,4-butane-triol, 1,2,5-pentane-triol, 2-methylpropane-triol, 2-methyl-1,2,4-butane-triol, trimethylolethane, trimethylolpropane, 1,3,5-trihydroxybenzene, glycerol and polyvinyl alcohol. These alcohols can be used singly or as a mixture of two or more thereof. Preferably, pentaerythritol, 1,1,1-trimethylolpropane and glycerol are used as the polyhydric alcohol, because the reactivity thereof with carboxylic acids is high.

If a polyhydric alcohol having a trivalency or a higher valency, as exemplified above, is used for the preparation of the polyester, it is easy to control the Tg of the obtained polyester to a desired level, and thus in the present invention, preferably the polyhydric alcohol is used in an amount of 1 to 30 mole% based on the total carboxylic acid components.

Any known monocarboxylic acids can be used as the monocarboxylic acid in working the present invention. For example, there can be mentioned benzoic acid, chlorobenzoic acid, bromobenzoic acid, p-hydroxybenzoic acid, salicylic acid, thiosalicylic acid, phenylacetic acid, acetic acid, propionic acid, butyric acid, isobutyric acid, octane-carboxylic acid, lauric acid, stearic acid, and lower alkyl esters thereof. These monocarboxylic acids can be used singly or as a mixture of two or more thereof. In view of the moisture resistance, chargeability, and heat resistance of the toner comprising the obtained polyester as the binder, preferably benzoic acid is used as the monocarboxylic acid, preferably in an amount of 2 to 40 mole%, especially 5 to 30 mole%, based on the total carboxylic acid components. Since the monocarboxylic acid has a function of blocking the growing terminals of the formed polyester, if an excessive amount of the monocarboxylic acid is used, the polyester-forming reaction is inhibited and the intended crosslinked polyester cannot be obtained.

In the present invention, a mono-alcohol and other additives can be used according to need in the production of the polyester. As the mono-alcohol, there can be mentioned benzyl alcohol, toluene-4-methanol, and cyclohexane-methanol, and as the additive, an anti-oxidant and an inorganic filler can be used.

Where an esterification product is prepared by using an alkyl ester of a dicarboxylic acid or an alkyl ester of a polyvalent carboxylic acid having a trivalency or a higher valency as the starting material, preferably a compound of titanium, manganese, magnesium, tin, calcium, zinc, lead, germanium or antimony is used as the ester exchange catalyst. The reaction is preferably carried out at a temperature higher than 150° C.

The conversion P (the ratio of conversion of the total carboxylic acid components to an esterification product) at the reaction for obtaining the esterification product can be determined by measuring the amount of water or the mono-alcohol formed during the reaction.

The amount of water or the mono-alcohol distilled from the reaction system is measured, for example, by separating water or the mono-alcohol, distilled together with the diol from the reaction vessel, from the diol by a distillation column, removing the separated water or mono-alcohol from the reaction system, and measuring the obtained amount of water or mono-alcohol.

The crosslinked polyester of the present invention is prepared by subjecting the obtained esterification product to polycondensation in the presence of a polycondensation catalyst at a temperature of about 200° to about 280° C. and under a reduced pressure lower then 150 mmHg, preferably lower than 20 mmHg, more preferably lower than 5 mmHg.

Any catalysts customarily used for the polycondensation for the synthesis of polyesters can be used as the polycondensation catalyst in the present invention. For example, there can be mentioned compounds of tin, antimony, titanium, calcium, lead, iron, and nickel.

When the polycondensation of the esterification product is started, the diol is mainly formed with the advance of the reaction, and by removing the formed diol from the reaction system, the polycondensation is further advanced, whereby the intended crosslinked polyester of the present invention is obtained.

The reaction speed of the polycondensation can be controlled by adjusting the speed at which the diol is removed from the reaction system by distillation.

If the ratio of the carboxylic acids to polyols in the reaction mixture is controlled to a level necessary for advancing the crosslinking reaction by adjusting the distillation of the diol from the reaction system, the crosslinking reaction is advanced and the formed polyester is crosslinked, and finally, the reaction mixture reaches the gelling point, and just after the reaction mixture reaches at the gelling point, the crosslinking reaction is drastically advanced. The arrival at the gelling point can be confirmed by an abrupt rise of the viscosity of the reaction liquid, observed just after the arrival the gelling point is reached. The speed of the crosslinking reaction after the gelling point is reached by the polyester condensation reaction can be controlled by adjusting the speed of distillation of the diol from the reaction system.

After reaching the gelling point, the viscosity of the reaction liquid is drastically increased with a distillation of the diol from the reaction system. At this point, the vacuum degree in the reaction vessel is reduced, i.e., the pressure in the reaction vessel is elevated, and thus a too rapid advance of the crosslinking reaction of the polyester is controlled by controlling the distillation speed of the diol, and the reaction is stopped at the point at which the desired crosslinking degree is attained, whereby a crosslinked polyester having the required characteristics is obtained.

At an appropriate stage after reaching the gelling point, the condensation reaction is stopped by restoring the pressure in the reaction vessel to atmospheric pressure or stopping the distillation of the diol from the reaction system, whereby a polyester having a required crosslinking degree is obtained.

If the reaction is stopped at a point at which the reaction mixture has a required viscosity, a crosslinked polyester resin having a required melt viscosity can be obtained. Preferably, this viscosity is such that the flow index is $0.1 \times 10^{-4}$ to $300 \times 10^{-4}$ ml/sec.

As pointed out hereinbefore, the polyester of the present invention has an acid value of 5 to 20 mgKOH/g, preferably 5 to 15 mgKOH/g. Accordingly, in a toner prepared by using this polyester as the binder, the charge quantity is adjusted to about $-10$ to about $-30$ $\mu$C/g, and a copied image image density and a good contrast can be obtained when this toner is used.

A conventional polyester used in this field has carboxyl groups at the terminals and a high acid value, and the polyester has a negative chargeability. Moreover, since the terminal carboxyl group concentration is relatively high, the self-chargeability is high, and therefore, a toner prepared by using this polyester as the binder has an unsatisfactory sharpness of the formed image. In contrast, since the polyester of the present invention has an appropriate acid value, a toner prepared by using the polyester of the present invention as the binder has good chargeability characteristics and provides a sharp image.

The acid value of the polyester can be controlled by (a) adjusting the ratio of the carboxylic acids to diols in the starting material mixture, and (b) adjusting the conversion P at the step of forming the esterification product.

In the adjusting method (a), the acid value of the polyester can be increased by increasing the amount of the carboxylic acid component or reducing the amount of the lower alkyl ester of the carboxylic acid.

In the adjusting method (b), the acid value of the obtained polyester is increased by reducing the conversion P.

Namely, by adjusting the ratio of the carboxylic acids to diols and the conversion at the step of forming the esterification product within the ranges represented by the formulae (1) and (2), a polyester having an acid value within the range specified in the present invention can be obtained.

If it is necessary to change the acid value of the polyester within the range specified in the present invention, preferably a rough adjustment is carried out by the method (a) and a fine adjustment is carried out mainly by the method (b), because the influence of the obtained polyester on the acid value in the method (a) is larger than that in the method (b).

To obtain a polyester having a hydroxyl group value of 5 to 50 mgKOH/g at a high efficiency according to the present invention, preferably a monocarboxylic acid is used as the starting material. A polyester having a hydroxyl group value smaller than 5 mgKOH/g does not have a satisfactory reactivity, and a toner obtaining by using a polyester having a hydroxyl group value larger than 50 mgKOH/g as the binder has a poor moisture resistance. Preferably, the hydroxyl group value of the polyester is 7 to 40 mgKOH/g, more preferably 10 to 35 mgKOH/g.

The acid value and hydroxyl group value of the polyester can be determined by the method of JIS K-0070.

The crosslinked polyester of the present invention has a flow index of $0.1 \times 10^{-4}$ to $300 \times 10^{-4}$ ml/sec, and in the softened or molten state, the polyester has a flowability suitable for adhesion and fixing to a paper or the like.

A toner prepared by using a polyester having a flow index included within the above-mentioned range as the binder will easily intrude into voids of the containing surface layer of a paper or the like at the fixing step, and can be firmly adhered to the surface layer.

In contrast, a toner prepared by using a polyester having a flow index smaller than $0.1 \times 10^{-4}$ ml/sec as the binder does not have a good flow ability under heating, and therefore, the toner is not properly fixed to the surface of the paper or film and remains on the fixing hot roll to contaminate a following paper or film. A toner prepared by using a polyester having a flow index larger than $300 \times 10^{-4}$ ml/g as the binder causes an offset phenomenon at the fixing step, and good results cannot be obtained. In the polyester of the present invention, the flow index is controlled to $0.1 \times 10^{-4}$ to $300 \times 10^{-4}$ ml/sec, as pointed out above, but preferably the flow index of the polyester is $0.5 \times 10^{-4}$ to $50 \times 10^{-4}$ ml/sec, more preferably $1 \times 10^{-4}$ to $20 \times 10^{-4}$ ml/sec.

Since the crosslinked polyester resin of the present invention has a softening point lower than 145° C., it is possible to fix a toner image at a low temperature, and accordingly, a toner having a practically satisfactory heat efficiency for the fixation and high fixation speed can be provided by using the polyester of the present invention as the binder. Note, if the toner is prepared by using a polyester having a softening point higher than 145° C. as the binder, the low-temperature fixing property is poor and the copying operation cannot be carried out at a high speed.

Preferably, the Tg of the polyester of the present invention is set at 30 to 68° C. In a toner prepared by using a polyester having a Tg lower than 30° C. as the binder, adhesion or agglomeration (blocking) of toner particles occurs during storage, and the storage stability is poor. In a toner prepared by using a polyester having a Tg higher than 68° C. as the binder, the low-temperature fixing property is poor and good results cannot be obtained.

In the present invention, the acid value of a polyester was determined by titrating a solution of the polyester in benzyl alcohol with KOH. The Tg was determined by the DSC method (temperature-elevating rate 5° C./min). The softening point was determined by a method in which a flow tester provided with a nozzle having a diameter of 1.0 mm and a length of 1.0 mm (Model CFT-500 supplied by Shimadzu Corporation) was used, and the temperature at which ½ of 1 g of the sample heated under a load of 30 kg at a temperature-elevating rate of 3° C./min flowed from the top end of the nozzle was measured. The flow index was determined by a method in which a flow tester provided with a nozzle having a diameter of 1.0 mm and a length of 10.0 mm was used, the polyester was extruded from the nozzle under a load of 10 kg at a temperature of 150° C., and the flow speed of the extruded softened polyester was measured. The charge quantity of a toner comprising a polyester as the binder was determined by the following procedures.

In a Henschel mixer, 95 parts by weight of a polyester were thoroughly blended with 5 parts by weight of carbon black, and the mixture was kneaded at 180° C. in a screw extruder. The kneaded mixture was cooled and pulverized to a particle size of 5 to 20 μm by a jet mill, to obtain a toner, and 1 g of the obtained toner and 19 g of an iron powder as the carrier were charged in a sample bottle and shaken for about 15 minutes in an atmosphere maintained at a temperature of 25° C. and a relative humidity of 50%. Then, 0.2 g of the mixture was samples and the charge quantity was measured by a blow-off powder charge quantity measuring device (supplied by Toshiba Chemical) (blow-off method).

The present invention will now be described in detail with reference to the following examples and comparative examples. Note, all of "part" in the examples and comparative examples are molar parts, unless otherwise indicated. In the tables given hereinafter, BPPO represents polyoxypropylene-(2.3)-2,2bis(4-hydroxyphenyl)propane, and BPEO represents polyethylene-(2,2)-bis(4-hydroxyphenyl)propane.

EXAMPLES 1 THROUGH 4

A starting material (total amount = 800 g) comprising a carboxylic acid having a trivalency or a higher valency, a dicarboxylic acid and a diol at a ratio shown in Table 1 was charged in an autoclave having a capacity of 2 l and equipped with a distillation column, and esterification was carried out until a conversion shown in Table 1 was attained. Then, antimony trioxide was charged in the autoclave in an amount of 500 ppm based on the charged carboxylic acids, and polycondensation was carried out while maintaining the pressure in the autoclave at 3 mmHg and removing glycol from the reaction mixture, whereby a crosslinked polyester was obtained. Note, at the point when the stirring torque was elevated to 1.5 kg-cm (200 rpm) during the polycondensation, the vacuum degree in the autoclave was adjusted to 30 mmHg and the stirring rotation number was adjusted to 100 rpm, and the reaction was further conducted. When the stirring torque was elevated to 7 kg-cm (100 rpm), the pressure in the autoclave was restored to atmospheric pressure and the reaction was terminated. The acid value, softening point, and flow index of the obtained polyester were measured. The results are shown in Table 1.

Then, 95 parts by weight of the obtained polyester were mixed and kneaded with 5 parts by weight of carbon black, and the mixture was cooled, pulverized and classified to obtain a toner composed of particles having an average particle size of 10 to 13 μm.

The charge quantity, lowest fixing temperature, offset-generating temperature and blocking resistance of the toner were examined. The results are shown in Table 1.

The lowest fixing temperature was determined by the following method.

A hot roller fixing device comprising a pair of a hot rollers composed of a fluorine resin and a rubber roller, in which the heating temperature of the hot roller could be freely set, was used. The peripheral speed of the roller composed of a fluorine resin was adjusted to 20 cm/sec, and the roller compression load was adjusted to 14 kg-f. A toner image-transferred paper was passed between the two rotating rollers, and the toner fixing ratio of the fixed image was determined by the method described below. The temperature at which the fixing ratio rose to 95% was designated as the lowest fixing temperature.

The toner fixing ratio was determined by the following method.

An adhesive cellophane tape was applied to the surface of a fixed toner image (solid black portion) and then peeled off. The toner density was measured before and after this treatment by a reflection densitometer (supplied by Macbeth Co.), and the ratio between the values obtained before and after the treatment was determined as the fixing ratio.

The offset-generating temperature was determined by the following method.

In the same manner as for the measurement of the lowest fixing temperature, the toner image was fixed on a copying paper by the hot roller fixing device while changing the heating temperature of the hot roller, and then a white copying paper was fed under the same conditions to the fixing device and it was determined whether or not the copying paper was contaminated with the toner. The temperature of the hot roller at which contamination with the toner began on the white copying paper was designated as the offset-generating temperature.

The blocking resistance of the toner was determined by the following method.

The toner was packed in a vessel and allowed to stand under a temperature of about 25° C. and a relative humidity of 60% for 48 hours. The agglomeration of particles and the degree of the agglomeration were examined and the blocking resistance was evaluated according to the following rating.

⊚ : very good (no agglomeration observed)

o : good (if the vessel was turnedupside down and lightly tapped, the particles were dispersed again)

Δ: relatively bad (if the vessel was turned upside down and strongly tapped, the particles were dispersed again)

X: bad (even if the vessel was tapped, the particles were not dispersed again)

The results are shown in Table 1.

When copying was carried out by using the toners shown in Table 1, a sharp copy image having a high image density, a high contrast, and a good blocking resistance was obtained in each case.

TABLE 1

| | Example No. | | 1 | 2 | 3 | 4 |
|---|---|---|---|---|---|---|
| Charged Composition (parts) | terephthalic acid | | 50 | 90 | 60 | 85 |
| | isophthalic acid | | 40 | — | 30 | 0 |
| | trimellitic anhydride | | 10 | 10 | 10 | 15 |
| | BPPO | | 50 | — | 40 | 30 |
| | BPEO | | — | — | 0 | 0 |
| | ethylene glycol | | 60 | 55 | 55 | 55 |
| | neopentyl glycol | | — | 50 | 0 | 10 |
| Conversion (P) | (%) at Esterification | (%) | 85 | 90 | 85 | 85 |
| Characteristics of Polyester | Tg | (°C.) | 65 | 48 | 64 | 64 |
| | flow index | (ml/sec) | $18 \times 10^{-4}$ | $36 \times 10^{-4}$ | $0.8 \times 10^{-4}$ | $1.2 \times 10^{-4}$ |
| | softening point | (°C.) | 136 | 143 | 145 | 143 |
| | acid value | (mgKOH/g) | 12 | 17 | 16 | 18 |
| Characteristics of Toner | charge quantity | (μC/g) | 20 | 23 | 22 | 18 |
| | lowest fixing temperature | (°C.) | 163 | 168 | 171 | 164 |
| | offset-generating temperature | (°C.) | above 240 | above 240 | above 240 | above 240 |
| | blocking resistance | | ⊚ | o | ⊚ | ⊚ |

EXAMPLES 5 THROUGH 10

A crosslinked polyester resin was prepared in the same manner as described in Example 1 except that the starting materials shown in Table 2 were used, and 400 ppm (based on the total carboxylic acid components) of zinc acetate as the ester exchange catalyst and 500 ppm (based on the total carboxylic acid components) of dibutyl tin oxide as the polycondensation catalyst were used. A toner was prepared by using the obtained polyester as the binder in the same manner as described in Example 1.

The physical properties of the obtained polyester and toner were determined as described in Example 1. The results are shown in Table 2.

From the results shown in Table 2, it is understood that the crosslinked polyester resins obtained in the foregoing examples were excellent as the binder for a toner.

TABLE 2

| | Example No. | | 5 | 6 | 7 | 8 | 9 | 10 |
|---|---|---|---|---|---|---|---|---|
| Charged Composition (parts) | terephthalic acid | | 70 | 70 | 50 | 95 | 100 | 100 |
| | isophthalic acid | | 30 | 30 | 50 | 0 | 0 | 0 |
| | trimellitic anhydride | | 0 | 0 | 0 | 5 | 0 | 0 |
| | trimethylol propane | | 0 | 10 | 0 | 5 | 10 | 0 |
| | pentaerythritol | | 5 | 0 | 20 | 0 | 0 | 15 |
| | BPPO | | 45 | 40 | 30 | 30 | 50 | 35 |
| | ethylene glycol | | 45 | 40 | 20 | 50 | 60 | 35 |
| | neopentyl glycol | | 0 | 0 | 10 | 20 | 0 | 0 |
| Conversion (P) | (%) at Esterification | (%) | 85 | 85 | 80 | 90 | 95 | 80 |
| Characteristics of Polyester | Tg | (°C.) | 62 | 63 | 60 | 58 | 51 | 64 |
| | flow index | (ml/sec) | $2.3 \times 10^{-4}$ | $1.5 \times 10^{-4}$ | $18 \times 10^{-4}$ | $32 \times 10^{-4}$ | $68 \times 10^{-4}$ | $2.0 \times 10^{-4}$ |
| | softening point | (°C.) | 136 | 140 | 132 | 129 | 126 | 141 |
| | acid value | (mgKOH/g) | 11 | 16 | 18 | 7 | 5 | 17 |
| Characteristics of | charge quantity | (μC/g) | 17 | 18 | 22 | 12 | 13 | 24 |
| | lowest fixing | (°C.) | 158 | 154 | 148 | 146 | 140 | 155 |

TABLE 2-continued

| Example No. | | 5 | 6 | 7 | 8 | 9 | 10 |
|---|---|---|---|---|---|---|---|
| Toner | temperature offset-generating temperature (°C.) | above 240 | above 240 | above 240 | 230 | 220 | above 240 |
| | blocking resistance | ○ | ○ | ○ | ○ | ○ | ○ |

COMPARATIVE EXAMPLES 1 THROUGH 4

A polyester resin was prepared in the same manner as described in Example 1 except that the starting materials shown in Table 3 were used, and a toner was prepared by using the obtained polyester as the binder.

The physical properties of the obtained polyester and toner were determined in the same manner as described in Example 1. The results are shown in Table 3.

Note, the physical properties of the sample determined just after termination of the reaction are shown in Comparative Example 1.

As apparent from the results shown in Table 3, none of the toners obtained in Comparative Examples 1 through 4 had completely satisfactory characteristics.

When copying was carried out by using the toners shown in Table 3 according to the electrostatic recording method, it was found that the sharpness of the image was poor in each case.

COMPARATIVE EXAMPLE 5

A polyester was prepared in the same manner as described in Example 1 except that the starting materials shown in Table 4 were used and the reaction was terminated at the point when the stirrer stopped. A toner was prepared by using the obtained polyester as the binder.

The physical properties of the obtained polyester and toner were determined in the same manner as described in Example 1. The results are shown in Table 4.

As apparent from the results shown in Table 4, the toner obtained in the present comparative example did not have completely satisfactory toner characteristics.

When copying was carried out by using the toner shown in Table 4 by the electrostatic copying process, a copy having a high image density and a high contrast could not be obtained.

TABLE 3

| | Comparative Example No. | | 1 | 2 | 3 | 4 |
|---|---|---|---|---|---|---|
| Charged | terephthalic acid | | 50 | 70 | 50 | 85 |
| Compo- | isophthalic acid | | 40 | 15 | 35 | — |
| sition | trimellitic anhydride | | 10 | 15 | 15 | 15 |
| (parts) | BPPO | | 20 | 40 | 40 | 20 |
| | ethylene glycol | | 80 | 40 | 120 | 55 |
| | neopentyl glycol | | — | — | 40 | — |
| Conversion (P) | (%) at Esterification | (%) | 98 | 68 | 96 | 65 |
| Character- | Tg | (°C.) | 56 | 68 | 55 | |
| istics of | flow index | (ml/sec) | $2 \times 10^{-4}$ | $350 \times 10^{-4}$ | $8 \times 10^{-4}$ | — |
| Polyester | softening point | (°C.) | 163 | 141 | 126 | — |
| | acid value | (mgKOH/g) | 2 | 25 | 2 | — |
| Character- | charge quantity | (μC/g) | 8 | 35 | 6 | — |
| istics of | lowest fixing temperature | (°C.) | above 190 | 138 | 143 | — |
| Toner | offset-generating temperature | (°C.) | above 240 | 138 | above 240 | — |
| | blocking resistance | | ○ | ○ | ○ | — |
| | Remarks | | gelation was not stopped and charge quantity was too small | not gelled | charge quantity was too small | not gelled but entirely opacitied |

TABLE 4

| | Comparative Example No. | | 5 |
|---|---|---|---|
| Charged | terephthalic acid | | 100 |
| Compo- | pentaerythritol | | 3 |
| sition | BPPO | | 30 |
| (parts) | ethylene glycol | | 60 |
| | neopentyl glycol | | 10 |
| Conversion (P) | (%) at Esterification | (%) | 95 |
| Character- | Tg | (°C.) | 57 |
| istics of | flow index | (ml/sec) | $0.03 \times 10^{-4}$ |
| Polyester | softening point | (°C.) | 158 |
| | acid value | (mgKOH/g) | 6 |
| Character- | charge quantity | (μC/g) | 10 |
| istics of | lowest fixing temperature | (°C.) | 189 |
| Toner | offset-generating temperature | (°C.) | above 240 |
| | blocking resistance | | o |

EXAMPLE 11

An autoclave equipped with a distillation column was charged with carboxylic acids, a polyol and a catalyst, as shown in Table 5, and the temperature was elevated under atmospheric pressure. When the inner temperature reached at 170° C., distillation of water from the distillation column began.

TABLE 5

|  | Molar Parts |
| --- | --- |
| Terephthalic acid | 75 |
| Trimellitic anhydride | 25 |
| Ethylene glycol | 150 |
| Benzoic acid | 25 |
| Dibutyl tin oxide | 0.03 |

Esterification was carried out while maintaining the temperature of the top of the column at 100° C. When the conversion was elevated to 95%, the esterification reaction was terminated, the distillation column dismounted, the pressure in the autoclave reduced to 2 Torr, and polycondensation was carried out while removing distilled water and ethylene glycol from the reaction system. When the stirring torque began to rise, the pressure in the autoclave was adjusted to 50 Torr, and when the crosslinking degree reached a desired level, the pressure in the autoclave was restored to atmospheric pressure. The content was extruded into water through a valve arranged at the bottom of the autoclave, and then removed therefrom.

The acid value of the obtained crosslinked polyester was 10 mgKOH/g, and the hydroxyl group value was 11 mgKOH/g.

Then, 100 parts by weight of the crosslinked polyester were heated and kneaded with 5 parts by weight of carbon black (Regal 400R supplied by Cabot), and the kneaded mixture was cooled, pulverized and classified to obtain toner particles having a particle size of 5 to 20 μ. A developer was prepared by mixing 5 parts by weight of the toner with 95 parts by weight of an iron powder carrier (TEFV 200/300 supplied by Nippon Teppun). The relative charge quantity Q/M of the toner is the developer was measured at a temperature of 25° C. and a relative humidity of 50% (normal humidity), by the blow-off method, and it was found that the relative charge quantity was −17 μC/g. The mixing of the developer comprising the above-mentioned toner and iron powder carrier was carried out at a temperature of 30° C. and a relative humidity of 90% (high humidity). The relative charge quantity Q/M of the toner in the developer was −16 μC/g, and it was found that the humidity dependency of the frictional charge characteristic of the toner was very low.

It was confirmed that the crosslinked polyester of the present invention is an excellent polymer binder for a toner, and does not require a charge-controlling agent and has a greatly reduced humidity dependency.

EXAMPLE 12

A crosslinked polyester was prepared by carrying out the esterification reaction in the same manner as described in Example 11 except that the starting materials shown in Table 6 were used.

TABLE 6

|  | Molar Parts |
| --- | --- |
| Terephthalic acid | 80 |

TABLE 6-continued

|  | Molar Parts |
| --- | --- |
| Dimethyl isophthalate | 20 |
| Ethylene glycol | 180 |
| Glycerol | 20 |
| Propionic acid | 15 |
| Antimony trioxide | 0.05 |
| Zinc acetate | 0.04 |

The acid value of the obtained crosslinked polyester was 9 mgKOH/g, and the hydroxyl group value was 28 mgKOH/g. The test was carried out in the same manner as described in Example 11, and the following results were obtained.

Q/M of toner under normal humidity: −13 μC/g
Q/M of toner under high humidity: −11 μC/g

EXAMPLE 13

A crosslinked polyester was prepared in the same manner as described in Example 11 except that the starting materials shown in Table 7 were used.

TABLE 7

|  | Molar Parts |
| --- | --- |
| Terephthalic acid | 90 |
| Adipic acid | 5 |
| Trimethylolpropane | 5 |
| Ethylene glycol | 120 |
| Neopentyl glycol | 30 |
| Methyl benzoate | 5 |
| Antimony trioxide | 0.05 |

The acid value of the obtained crosslinked polyester was 6 mgKOH/g, and the hydroxyl group value was 15 mgKOH/g. The test was carried out in the same manner as described in Example 11, and the following results were obtained.

Q/M of toner under normal humidity: −12 μC/g
Q/M of toner under high humidity: −12 μC/g

EXAMPLE 14

A crosslinked polyester was prepared in the same manner as described in Example 11 except that the starting materials shown in Table 8 were used and the conversion (P) was adjusted to 98%.

TABLE 8

|  | Molar Parts |
| --- | --- |
| Terephthalic acid | 47 |
| Isophthalic acid | 35 |
| Trimellitic anhydride | 18 |
| p-Toluic acid | 5 |
| Ethylene glycol | 60 |
| Polyoxypropylene-(2,3)-2,2-bishydroxypropane | 50 |
| Titanium butoxide | 0.05 |

The acid value of the obtained polyester was 18 mgKOH/g, and the hydroxyl group value was 43 mgKOH/g.

The test was carried out in the same manner as described in Example 11 except that 3 parts by weight of Bontron S-32 (supplied by Orient Chemical) was incorporated into 100 parts by weight of the polyester, and the following results were obtained.

Q/M of toner under normal humidity: −25 μC/g
Q/M of toner under high humidity: −21 μC/g It was found that the charge characteristics of the toner were stable.

EXAMPLE 15

A crosslinked polyester was prepared in the same manner as described in Example 11 except that the starting materials shown in Table 9 were used and the conversion (P) was adjusted to 92%.

TABLE 9

|  | Molar Parts |
| --- | --- |
| Terephthalic acid | 60 |
| Isophthalic acid | 30 |
| Trimellitic anhydride | 10 |
| Pentaerythritol | 15 |
| Ethylene glycol | 150 |
| Polyoxypropylene-(2,2)-2,2-bishydroxyphenylpropane | 50 |
| Benzoic acid | 60 |
| Antimony trioxide | 0.05 |

The acid value of the obtained crosslinked polyester was 12 mgKOH/g, and the hydroxyl group value was 10 mgKOH/g. The toner was prepared and tested in the same manner as described in Example 11, and the following results were obtained.

Q/M of toner under normal humidity: $-20$ μC/g
Q/M of toner under high humidity: $-19$ μC/g

COMPARATIVE EXAMPLE 6

A polyester was prepared in the same manner as described in Example 11 except that the starting materials shown in Table 10 were used and the conversion (P) was adjusted to 65%.

TABLE 10

|  | Molar Parts |
| --- | --- |
| Terephthalic acid | 80 |
| Isophthalic acid | 20 |
| Ethylene glycol | 160 |
| Polyoxypropylene-(2,2)-2,2-bishydroxyphenylpropane | 20 |
| Glycerol | 20 |
| Dibutyl tin oxide | 0.04 |

The acid value of the obtained polyester was mgKOH/g, and the hydroxyl group value was 53 mgKOH/g. A toner was prepared and tested in the same manner as described in Example 11, and the following results were obtained.

Q/M of toner under normal humidity: $-31$ μC/g
Q/M of toner under high humidity: $-21$ μC/g From the foregoing results, it was confirmed that the charge quantity of the polyester obtained in the present comparative example was too large and the charge characteristics were strongly influenced by the humidity, and that the polyester was not suitable as the binder for a toner.

COMPARATIVE EXAMPLE 7

A crosslinked polyester was prepared in the same manner as described in Example 11 except that the starting materials shown in Table 11 were used and the conversion (P) was adjusted to 96%.

TABLE 11

|  | Molar Parts |
| --- | --- |
| Terephthalic acid | 90 |
| Trimellitic anhydride | 10 |
| Ethylene glycol | 200 |
| Neopentyl glycol | 50 |
| Benzoic acid | 1 |

TABLE 11-continued

|  | Molar Parts |
| --- | --- |
| Antimony trioxide | 0.05 |

The acid value of the obtained polyester was 4 mgKOH/g, and the hydroxyl group value was 55 mgKOH/g. A toner was prepared and tested in the same manner as described in Example 11, and the following results were obtained.

Q/M of toner under normal humidity: $-11$ μC/g
Q/M of toner under high humidity: $-7$ μC/g From the foregoing results, it was confirmed that the polyester obtained in the present comparative example was greatly influenced by the humidity, and the polyester was not suitable as the binder for a toner.

As apparent from the foregoing description, the polyester resin of the present invention is a crosslinked polyester having an appropriately low softening point and a good flowability when softened and molten. Accordingly, a toner prepared by using the polyester of the present invention has an excellent offset-preventing property and low-temperature fixing property and is very suitable for a high-speed fixing operation.

Furthermore, the crosslinked polyester of the present invention has an acid value necessary for imparting a good charge quantity to a toner, and by using this polyester, a toner having a good charge quantity can be obtained without using a charge-control agent.

Since the acid value of the crosslinked polyester can be optionally controlled according to the process of the present invention, the charge quantity of the toner can be optionally controlled by adjusting the acid value of the crosslinked polyester.

The crosslinked polyester has a satisfactorily high glass transition temperature (Tg), although the softening point is low, and accordingly, a toner comprising this crosslinked polyester as the binder has a good offset-preventing property and a good low-temperature fixing property, and at the same time, the toner has a good storage stability.

Therefore, if a toner comprising the crosslinked polyester of the present invention as the binder is used, a toner image can be obtained by high-speed development, and a high operation speed can be attained in a copying machine or a laser beam printer (LBP).

We claim:

1. A crosslinked polyester for a toner, which has an acid value of 5 to 20 mgKOH/g, a flow index of $0.1 \times 10^{-4}$ to $300 \times 10^{-4}$ ml/sec and a softening point lower than 145° C., said polyester being formed by mixing a dicarboxylic acid component, a diol component and at least one crosslinking component selected from the group consisting of a polyfunctional carboxylic acid component having a trivalency or a higher valency and a polyhydric alcohol component having a trivalency or a higher valency at a mixing ratio represented by the following formulae (1) and (3), reacting the mixture at a reaction ratio represented by the following formula (2) and subjecting the esterification product to polycondensation and crosslinking:

$$0.8 \leq R \leq 1 + 5a \quad (1)$$

$$0.7 \leq [P]P/100 \leq [R/(1+a)]^{\frac{1}{2}} \quad (2)$$

$$[R/(1+a)]^{\frac{1}{2}} \leq 1 \quad (3)$$

wherein R stands for the ratio of the mole of the total alcohol components to the mole number of the total acid components, a stands for the ratio of the sum of the mole number of the polyvalent carboxylic acid component having a trivalency or a higher valency and the mole number of the polyhydric alcohol component having a trivalency or a higher valency to the mole number of the total acid component, and P stands for the conversion of the carboxylic acid component in percent.

2. A crosslinked polyester for a toner according to claim 1, wherein the dicarboxylic acid component comprises at least 40 mole%, based on the total carboxylic acid components, of terephthalic acid or total carboxylic acid components, of isophthalic acid or dimethyl terephthalate, and up to 60 mole%, based on the dimethyl isophthalate.

3. A crosslinked polyester for a toner according to claim 1, wherein the diol component comprises, based on the total carboxylic acid components, at least 20 mole% of ethylene glycol, up to 80 mole% of an aromatic diol, or up to 80 mole% of neopentyl glycol.

4. A crosslinked polyester for a toner according to claim 3, wherein the polyfunctional carboxylic acid component comprises 5 to 40 mole%, based on the total carboxylic acid components, of trimellitic anhydride or methyl trimellitate.

5. A crosslinked polyester for a toner according to claim 1, wherein the polyhydric alcohol having a trivalency or a higher valency is used in an amount of 1 to 30 mole% based on the total carboxylic acid contents.

6. A crosslinked polyester for a toner according to claim 1, wherein the acid value is 5 to 15 mgKOH/g.

7. A crosslinked polyester for a toner according to claim 1, wherein the flow index is $3 \times 10^{-4}$ to $300 \times 10^{-4}$ ml/sec.

8. A crosslinked polyester for a toner according to claim 1, wherein the flox index is $0.1 \times 10^{-4}$ to $100 \times 10^{-4}$ ml/sec.

9. A crosslinked polyester for a toner according to claim 1, wherein the flow index is $0.5 \times 10^{-4}$ to $50 \times 10^{-4}$ ml/sec.

10. A crosslinked polyester for a toner according to claim 1, wherein the polycondensation is carried out under a reduced pressure lower than 150 mmHg in the presence of a polycondensation catalyst while removing the formed diol from the reaction system.

11. A crosslinked polyester for a toner according to claim 1, which is obtained by reacting said dicarboxylic acid component, said diol component, 1 to 40 mole%, based on the total carboxylic acid components, of said crosslinking component and a monocarboxylic acid component and subjecting the obtained esterification product to polycondensation, and has an acid value of 3 to 20 mgKOH/g and a hydroxyl group value of 5 to 50 mgKOH/g.

12. A crosslinked polyester for a toner according to claim 11, wherein the monocarboxylic acid component is used in an amount of 5 to 30 mole% based on the total carboxylic acid components.

13. A crosslinked polyester for a toner according to claim 11, wherein the acid value is 3 to 15 mgKOH/g and the hydroxyl group value is 5 to 30 mgKOH/g.

14. A crosslinked polyester for a toner according to claim 11, wherein the polycondensation is carried out under a reduced pressure lower than 150 mmHg in the presence of a polycondensation catalyst while removing the formed diol from the reaction system.

15. A crosslinked polyester for a toner according to claim 14, wherein the dicarboxylic acid component comprises at least 40 mole%, based on the total carboxylic acid components, of terephthalic acid or dimethyl terephthalate, and up to 60 mole%, based on the total carboxylic acid components, of isophthalic acid or dimethyl isophthalate.

16. A crosslinked polyester for a toner according to claim 14, wherein the diol component comprises, based on the total carboxylic acid components, at least 20 mole% of ethylene glycol, up to 80 mole% of an aromatic diol, or up to 80 mole% of neopentyl glycol.

17. A crosslinked polyester for a toner according to claim 14, wherein the polyfunctional carboxylic acid component comprises 5 to 40 mole%, based on the total carboxylic acid components, of trimellitic anhydride or methyl trimellitate.

18. A crosslinked polyester for a toner according to claim 14, wherein the polyhydric alcohol having a trivalency or a higher valency is used in an amount of 1 to 30 mole% based on the total carboxylic acid components.

19. A crosslinked polyester for a toner according to claim 14, wherein the acid value is 5 to 15 mgKOH/g.

20. A crosslinked polyester for a toner according to claim 14, wherein the flow index is $3 \times 10^{-4}$ to $300 \times 10^{-4}$ ml/sec.

21. A crosslinked polyester for a toner according to claim 14, wherein the flow index is $0.1 \times 10^{-4}$ to $100 \times 10^{-4}$ ml/sec.

22. A crosslinked polyester for a toner according to claim 14, wherein the flow index is $0.5 \times 10^{-4}$ to $50 \times 10^{-4}$ ml/sec.

* * * * *